Aug. 1, 1933.  F. W. DEARBORN  1,920,635

GASKET ATTACHING MEANS

Filed Dec. 7, 1932

INVENTOR
Frank W. Dearborn,
BY Fraser, Myers
& Manley,
his ATTORNEYS.

Patented Aug. 1, 1933

1,920,635

UNITED STATES PATENT OFFICE 1,920,635

GASKET-ATTACHING MEANS

Frank W. Dearborn, Brooklyn, N. Y., assignor to Gold Car Heating & Lighting Company, Brooklyn, N. Y., a Corporation of New York Application December 7, 1932. Serial No. 646,115

4 Claims. (Cl. 285—69)

This invention relates to improvements in gasket-attaching means, and, although adapted for general application, is more particularly intended to be used in securing a gasket against its seat in the coupling head of a connection of a railway train pipe.

It is an object of the invention to provide a relatively simple, readily attachable and detachable gasket-connecting element, which will be normally held in a position such as to facilitate the attachment of the gasket to the coupler, which wil provide for a limited degree of rocking movement between the attaching element and the gasket so that the gasket may have a relatively free limited movement with respect to its seat when the coupler head is being connected with another coupler, and all parts of which will lie relatively close to the inner surface of the gasket so as to avoid any material degree of obstruction to the flow of fluid through the opening in the gasket.

In the accompanying drawing illustrating preferred forms of the invention,—

The form of the invention illustrated in Figs. 1 to 5, inclusive, will first be described.

The gasket 20 is represented as being seated in the orifice of a coupler head 21 of well-known form, the seat 22 in the coupler head and the seating surface 23 of the gasket being spherical in order to provide for a limited rotational or rocking movement of the gasket in its seat for a reason which will hereinafter be set forth.

Figure 5:
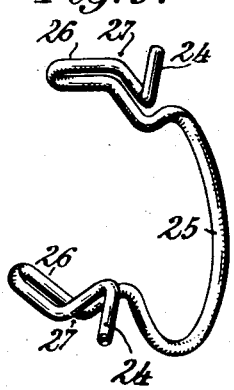
Fig. 5 is a perspective view of the preferred form of the gasket-attaching element represented as having been detached from the gasket.

The gasket may be detachably secured in position in the coupler head by means of an attaching element represented as having been detached from the gasket in Fig. 5. This attaching element may preferably be made from a single piece of wire bent to the form indicated and having end portions 24, an intermediate curved portion 25, and intervening portions doubled on themselves and extending approximately perpendicularly with respect to the plane of the end portions and curved portion to provide a pair of resilient fingers 26. These fingers may be bent outwardly or humped at 27 in order that they may be held in an engaging relation with undercut portions of the coupler head and afford a material degree of resistance to withdrawal.

The outwardly-turned end portions 24 of the attaching element may be snapped into engaging relation with oppositely-disposed recesses 28 (Figs. 3, 4 and 5) in the coupler head and serve as trunnions, the recesses 28 and trunnions 24 thus providing a pivotal connection between the attaching element and the gasket. The gasket may also be provided with a channeled or grooved portion 29 at one side intermediate the recesses 28, between the opposite walls 30, 31 of which the curved portion 25 of the attaching element may swing as the attaching element is rocked about its points of pivotal connection with the gasket.

It will be apparent that the swinging movement of the attaching element will be limited by engagement of its curved portion 25, which may be regarded as its movement-limiting portion, with the opposed walls of the groove in the gasket, and that, although the fingers 26 may have an equal limited angular movement, they will always be held in positions substantially perpendicular to the face of the gasket so that they can always be easily thrust into the orifice in the coupling head when it is desired to seat the gasket in the head.

Figure 2:
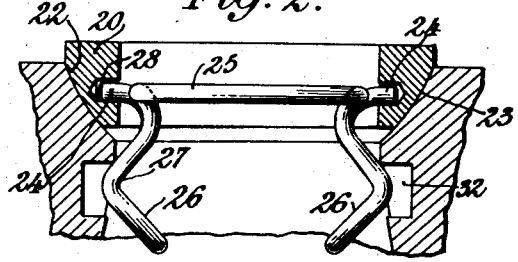
Fig. 2 is a cross-sectional view of the gasket illustrated in Fig. 1 and the adjacent portion of a coupling head in which the gasket is seated, the cross-section being taken along the line 2—2 and viewed in the direction indicated by the arrows.
Figure 3:
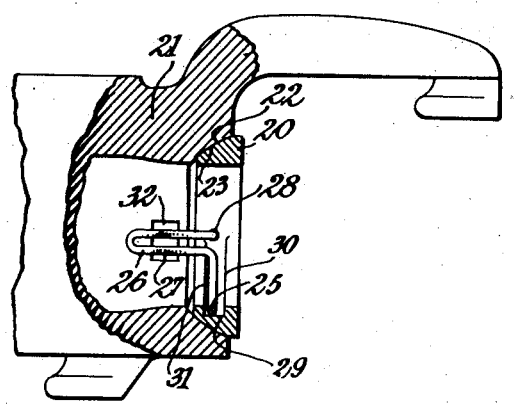
Fig. 3 is a cross-sectional view of the gasket illustrated in Fig. 1 and a portion of a coupler head in which it is seated, the cross-section being taken along the line 3—3 of Fig. 1 and viewed in the direction indicated by the arrows.
Figure 1:
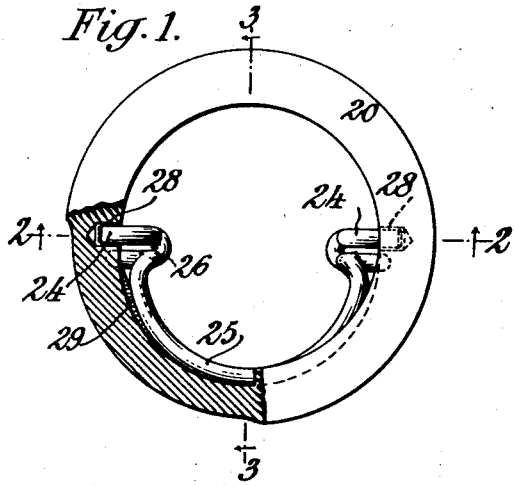
Figure 1 is a face view of a gasket and gasket-attaching element embodying the above-described invention.

In Figs. 1, 2 and 3 of the drawing the coupler head is illustrated as being provided with the usual undercut notches or recesses 32, into which the humped portions 27 of the resilient fingers 26 may expand as the fastening element is snapped into its engaging relation with the coupler head as best indicated in Fig. 2. When it is desired to detach the gasket all that is necessary is to pull it from its seat with sufficient force to flex the fingers 26 inwardly and thus dislodge them from their engagement with the parts of the coupler head adjacent the recesses 32 behind the seat.

Figure 4:
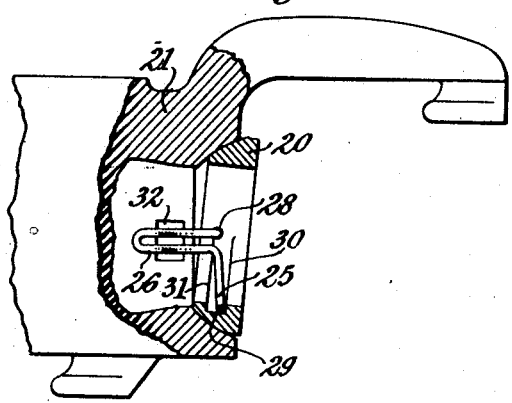
Fig. 4 is a cross-sectional view of the gasket illustrated in Fig. 3 and the part of the coupler head in which it is seated, the gasket being represented as having been rocked to an angular position with respect to its seat.

In the patent to Balmore, et al., No. 475,738, are clearly disclosed one form of hose coupling in which the gaskets embodying this invention may be used and the manner in which the heads of such coupling are connected and disconnected. As indicated in Fig. 1 of the patent referred to, the two heads about to be coupled are tilted upwardly and then brought into their interengaging relation by something in the nature of a rolling motion of each head with respect to the other from the relative positions indicated in Fig. 1 to positions in which the axis of each head is in line with the axis of the other. During this movement the lower portions of the gaskets in the respective heads are brought into contact with each other and forcibly pressed against their seats, whereas the upper portions of the gaskets are not at first in contact. When the couplers are brought to their final positions with their axes in alignment, the faces of the two gaskets are in contact and the surface pressure between the two gaskets and between each gasket and its seat is substantially uniform throughout. To facilitate this rolling motion of the coupler heads when being connected and disconnected, the gaskets are provided with spherical seating surfaces and are mounted against spherical surfaces in the coupler heads so that they may rock or have a limited rotational movement when the heads are being coupled or uncoupled. In Fig. 4 the gasket of the present invention is represented in the angular position which it assumes during a coupling or uncoupling of the head in which it is mounted with the head to which it is being connected or disconnected. It will be observed that although the gasket is tilted at an inclination with respect to its seat, the finger 26 of the attaching element maintains its position in substantial parallelism with the axis of the coupler head, this being permitted by the pivotal connection between the attaching element and the gasket and by the groove in which the curved part 25 of the gasket is amounted, the groove being of a width compared with the diameter of the wire such as to provide for the required degree of movement.

If, as indicated in Figs. 3 and 4, the relations of the parts are such that the wire 25 rests in substantial contact with the shoulder 31 of the groove when the gasket is in its normal position and may only provide for a rocking movement of the attaching element in the direction such as to shift the part 25 towards the shoulder 30, it would be essential that the gasket be always mounted in the coupler head with the wire 25 hanging down. It is not at all essential, however, that the invention be applied to the gasket in a form such that one side must always be positioned uppermost.

Figure 6:
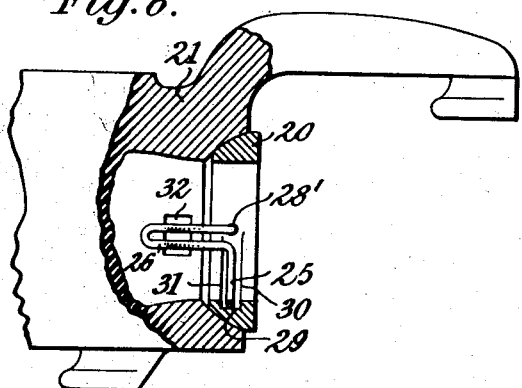
Fig. 6 is a cross-sectional view similar to that shown in Fig. 3 and representing the gasket and its attaching element in modified form.

In Fig. 6 is illustrated a modified form of the invention which conforms in every respect with that illustrated in Figs. 1 to 5, inclusive, except that the recesses 28' and the part 25 of the attaching element are so disposed with relation to the walls 30, 31 of the slot as to cause the part 25 of the wire to rest in an intermediate position in the slot when the gasket is in its normal position against its seat in the coupler head.

If the gasket and attaching device are made in accordance with this modified form of the invention, the gasket is invertible and the rocking movement between the gasket and the attaching element is not dependent upon which side of the gasket is uppermost when inserted in the coupling head.

It is, of course, not essential that the attaching element be made of a single piece of wire or be made of wire at all as distinguished from an equivalent element constructed of material in another form. Nor is it essential that the movement-limiting portion 25 of the attaching element be of the specific curved form illustrated in the drawing, or that the pair of stops 30, 31 be walls of a continuously-extending groove, or that the stops be both located at the same side of the gasket. What is important is that provision be made for a rocking movement of the attaching element, that the attaching element have a movement-limiting portion, and that the gasket have a pair of stops to cooperate with the movement-limiting portion and thereby determine its extent of rocking motion in opposite directions. And, in general, it may be said that the invention is not intended to be limited to either of the forms of the invention herein selected for purposes of illustration, but should be regarded as covering modifications and variations thereof within the scope of the appended claims.

What is claimed is:

1. A gasket having a spherical external seat-engaging surface, a pair of oppositely-disposed internal recesses, a groove in the inner surface of one side of said gasket between said recesses and a resilient attaching element comprising a wire having outwardly-disposed end portions adapted to be sprung into pivotal engagement with the recesses in the gasket, an intermediate curved portion to lie in said groove, and intervening portions between said end portions and said curved portions extending substantially perpendicularly with respect to the plane thereof, the intervening portions of the attaching element being bent to suitable form to serve as resilient gasket-attaching fingers and the slot in the gasket being of such width as compared with the dimensions of the curved portion of the attaching element as to provide for a swinging movement of the fingers of the attaching element with respect to the gasket, such movement being limited by engagement of the curved part of the attaching element with the opposite walls of the slot in the gasket.

2. A gasket having an attaching element closely following its inner surface, said attaching element having pivotal connections with the gasket at substantially diametrically opposite points, an intermediate movement-limiting portion and intervening resilient attaching fingers extending rearwardly and substantially perpendicularly with respect to the face of the gasket, the portion of the gasket adjacent the movement-limiting portion of the attaching element having spaced stops to determine the range of swing of the movement-limiting portion of the attaching element and its attaching fingers.

3. A gasket having a spherical external seat-engaging surface, a pair of oppositely-disposed internal recesses to receive a pair of trunnions of a gasket-attaching element, and a grooved internal portion at one side between said recesses to serve as spaced stops for a movement-limiting portion of such an attaching element.

4. A resilient gasket-attaching element comprising a single piece of wire having its central portion bent into an arc of a circle, its ends bent outwardly in opposite directions in the plane of the arc, and its intervening portions doubled on themselves and bent to positions substantially perpendicular to the plane of central and end portions, the said intervening doubled portions being outwardly humped at points intermediate their ends.

FRANK W. DEARBORN.